United States Patent
Bratu et al.

(10) Patent No.: US 11,843,960 B2
(45) Date of Patent: Dec. 12, 2023

(54) TEST SYSTEM AND TEST METHOD FOR TESTING A BROADBAND CELLULAR NETWORK

(71) Applicant: SIGOS GmbH, Nuremberg (DE)

(72) Inventors: Vlad Bratu, Nuremberg (DE); Goce Talaganov, Nuremberg (DE); Gerald Wittmann, Rednitzhembach (DE)

(73) Assignee: SIGOS GmbH, Nuremberg (DE)

( * ) Notice: Subject to any disclaimer, the term of this patent is extended or adjusted under 35 U.S.C. 154(b) by 124 days.

(21) Appl. No.: 17/301,672

(22) Filed: Apr. 12, 2021

(65) Prior Publication Data

US 2022/0330057 A1 Oct. 13, 2022

(51) Int. Cl.
*H04W 24/08* (2009.01)
*H04L 67/10* (2022.01)
*H04W 84/04* (2009.01)

(52) U.S. Cl.
CPC ............. *H04W 24/08* (2013.01); *H04L 67/10* (2013.01); *H04W 84/042* (2013.01)

(58) Field of Classification Search
None
See application file for complete search history.

(56) References Cited

U.S. PATENT DOCUMENTS 7,831,249 B2   11/2010  Löhlein et al.
8,229,416 B2 *  7/2012  Akman ................ H04W 24/06
                                                 455/67.11

(Continued)

FOREIGN PATENT DOCUMENTS

WO   2004049746 A1   6/2004
WO   2020154357 A1   7/2020

OTHER PUBLICATIONS

German Patent and Trademark Office, Office Action in related patent application DE 10 2021 203 569.8, dated Dec. 13, 2021.

*Primary Examiner* — Duc T Duong
(74) *Attorney, Agent, or Firm* — Smartpat PLC (57) ABSTRACT

A test system (1) serves to test a broadband cellular network. The test system (1) includes at least one user interface (2, 3) and at least one central test module (7) capable to run a predetermined or user-defined test method. A smartphone test probe interface module (13) of the test system (1) is connected to the central test module (7). Such smartphone test probe interface module (13) is capable to establish a data/signal connection between at least one smartphone test probe (14) and a network component of the broadband cellular network. The test system (1) further includes a radio test probe interface module (15) and a core network test probe interface module (17) capable to establish in a similar manner a data/signal connection between at least one radio/core test probe (16, 18) and a respective network component of the broadband cellular network. During a test method using such test system, a group of test probes is assigned to network components of the network to be tested via the respective interface modules (13, 15, 17). After that, at least one test sequence within the network is performed and data and results from the test probes (14, 16, 18) and the test sequences are aggregated to monitor the performance of the network. A test system results having enhanced capabilities to enable the testing of the broadband cellular network.

10 Claims, 7 Drawing Sheets

(56) References Cited

U.S. PATENT DOCUMENTS

| | | | | |
|---|---|---|---|---|
| 9,768,893 B1* | 9/2017 | Wank | .................. | H04B 17/0085 |
| 10,097,981 B1 | 10/2018 | Talaganov et al. | | |
| 10,791,459 B1 | 9/2020 | Hu et al. | | |
| 10,848,562 B1 | 11/2020 | Hu et al. | | |
| 11,102,081 B1* | 8/2021 | Tiwari | ................ | G06F 11/3688 |
| 11,695,679 B1* | 7/2023 | Lagerholm | ............ | H04L 43/045 |
| | | | | 709/224 |
| 2006/0046710 A1 | 3/2006 | Lohlein et al. | | |
| 2012/0076016 A1* | 3/2012 | Robbins | .................. | H04L 43/50 |
| | | | | 370/252 |
| 2013/0124712 A1* | 5/2013 | Parker | .................... | H04L 43/55 |
| | | | | 709/224 |
| 2018/0049050 A1* | 2/2018 | Doshi | .................. | H04W 24/06 |
| 2018/0049052 A1* | 2/2018 | Doshi | .................. | H04W 24/06 |
| 2018/0368010 A1* | 12/2018 | Mitchell | ............. | H04L 41/0645 |
| 2021/0306235 A1* | 9/2021 | Al-Dulaimi | ........... | H04W 24/08 |
| 2022/0060963 A1* | 2/2022 | Szász | .................. | H04W 24/10 |
| 2022/0061059 A1* | 2/2022 | Dunsmore | ........... | H04W 24/06 |
| 2022/0095122 A1* | 3/2022 | Emani | ..................... | H04L 41/22 |
| 2022/0095141 A1* | 3/2022 | Amin | .................. | H04W 24/02 |
| 2022/0256371 A1* | 8/2022 | Lekutai | .................. | H04L 43/50 |
| 2022/0386159 A1* | 12/2022 | Thomas | ................ | H04W 88/06 |

\* cited by examiner

TEST SYSTEM AND TEST METHOD FOR TESTING A BROADBAND CELLULAR NETWORK

FIELD OF THE INVENTION

The invention relates to a test system for testing a broadband cellular network and to a test method for testing a broadband cellular network using such a test system.

BACKGROUND OF THE INVENTION

Test systems for mobile networks are known e.g. from U.S. Pat. No. 10,791,459 B1, from U.S. Pat. No. 10,848,562 B1, from U.S. Pat. No. 9,768,893 B1, from U.S. Pat. No. 10,097,981 B1, from U.S. Pat. No. 7,831,249 B2 and from WO 2004/049746 A1.

SUMMARY OF THE INVENTION

It is an object of the invention to enhance the capabilities of such a test system to enable the testing of a broadband cellular network.

This object is met by a test system for testing a broadband cellular network, the test system including:
- at least one user interface,
- at least one central test module capable to run a predetermined test method,
- a smartphone test probe interface module being connected to the central test module, the smartphone test probe interface module being capable to establish a data/signal connection between at least one smartphone test probe and a network component of the broadband cellular network,
- a radio test probe interface module being connected to the central test module, the radio test probe interface module being capable to establish a data/signal connection between at least one radio test probe and a network component of the broadband cellular network,
- a core network test probe interface module being connected to the central test module, the core network test probe interface module being capable to establish a data/signal connection between at least one core test probe and a network component of the broadband cellular network.

This object is further met by a test method for testing a broadband cellular network using a test system according to the invention including the following steps:
- assigning a group of test probes to network components of the network to be tested via the respective interface modules,
- performing at least one test sequence within the network,
- aggregating the data and results from the test probes and the test sequences to monitor the performance of the network.

An example for a broadband cellular network to be tested via the test system is a 5G network. With respect to 5G, it is referred to the English Wikipedia entry "5G" in the version of Mar. 18, 2021 and the references cited there. Having a test system with interfaces for smartphone test probes, for radio test probes and for core network test probes leads to a very flexible and scalable approach regarding broadband cellular network testing. Smartphone test probes may be used for testing quality of experience (QoE) parameters, in particular for testing respective key performance indicators (KPI). Such KPIs for example are identified in U.S. Pat. No. 10,791,459 B1.

A smartphone or a radio test probe may interact with the cellular network under test via a NR Uu interface. A core network test probe may interact with the cellular network under test via standardized interfaces, such as, but limited to N1/N2, N3, N4, Nausf, Nudm or Namf interfaces. With the test system, an end-to-end testing and/or a network component group testing and/or a network component testing is possible. A network component is a part of the broadband cellular network under test which is in signal/data connection with the remaining network via at least one standardized interface. Such interface standard as a rule is defined via a network standard, e.g. 5G. Such network component may be implemented as a network function, e.g. a 5G network function.

The central test module of the test system also is referred to as a main test module.

The predetermined test method may be a user-defined test method.

A test system, wherein the central test module is implemented on a cloud based server, i.e. a cloud based solution, makes it possible to use distributed test probe sites and may enable an access to nationally, internationally or globally distributed test probes. The central test module alternatively or in addition may be implemented as COTS (common of the shelf) hardware, may be implemented on at least one virtual machine or may be implemented in at least one container. With respect to virtualization and containers, it is referred to the English Wikipedia entry "OS Level virtualization" in the version of Mar. 27, 2021 and the references cited there.

A test system, including a plurality of radio test probes and/or a plurality of core test probes and/or a plurality of smartphone test probes, may include respective test probes distributed nationally and/or internationally and/or globally. In particular, roaming testing then is possible. In particular, such roaming testing may be performed via a plurality of respectively internationally distributed radio test probes. The test probes may be proprietary.

An application programming interface (API) which is included to the user interface, enables an interaction between third party applications and a test system. Such external components which may interact with the test system via an API may be externally programmed network functions, third party systems or DevOps tools. As such API may establish an interface between an external user software to the test system, the API is an example of the at least one user interface of the test system. The API may be a RESTful API. With respect to RESTful API, it is referred to the English Wikipedia entry "representational state transfer" in the version of Mar. 17, 2021 and the references cited there. The test system including the API may be integrated in a CI/CD pipeline. With respect to CI/CD pipeline and to DevOps, it is referred to the English Wikipedia entry "CI/CD" in the version of Mar. 23, 2021 and the references cited there.

The above discussed advantages also hold for a test method for testing a broadband cellular network using a test system according to the invention.

In addition to an aggregation of data and results, also a combination of such data and results is possible to acquire further insight in the broadband cellular network to be tested.

The advantages of a test method, wherein access to at least some of the used test probes is established via the cloud based server, correspond to those of the test system, wherein the central test module is implemented on a cloud based server.

During the test method, with help of at least some of the test probes, an end-to-end test sequence may be performed. Such an end-to-end sequence makes it possible to test the whole data/signal connection between an end user and a network service under test.

During the test method, with help of at least some of the test probes, a test sequence to test a group of network components may be performed. Such testing a group of network components helps to identify critical network components within the broadband cellular network to be tested.

This in particular holds to for a test method, wherein with help of at least some of the test probes, a test sequence to test a single network component is performed.

A test method, wherein during the assignment test probes are assigned to different network slices of the network to be tested, enables the testing of individual network slices of the network to be tested. With respect to slice, it is referred to the English Wikipedia entry "5G network slicing" in the version of Mar. 18, 2021 and the references cited there. The slices under test may be realized via radio access network (RAN) slicing and/or via core network (CN) slicing. This in particular is advantageous for a 5G network to be tested.

Slices tested via the test method, wherein during the test performance and the data aggregation test parameters are acquired for different network slices, may be identified via an NSSAI (network slice selection assistance information) list. Via such method, a correlation of QoS parameters to a respective network slice under test is possible.

With the method, wherein via the application programming interface the test procedures are controlled and/or configured to execute tailored automated test sequences, an interaction between third party applications and the test system is enabled. With such interaction, tailored automated test sequence are provided which fit to respective testing demands. The API used may be a RESTful API. The test method may be integrated in a CI/CD pipeline. In particular, a control and configuration of a data extraction and of measurements of the test system is possible with such test method.

A method, wherein via the application programming interface components external to the network to be tested are controlled and/or configured to execute tailored automated test sequences, gives further testing flexibility. Examples for external components which may be controlled and/or configured with such method are third party systems, DevOps tools and/or further added 5G network functions.

The network under test may be a roaming network. Such roaming network may be tested via a roaming test sequence performed with the help of at least some of the test probes.

Exemplify embodiments of the invention hereinafter described with reference to the accompanying drawings.

DETAILED DESCRIPTION

Figure 1:
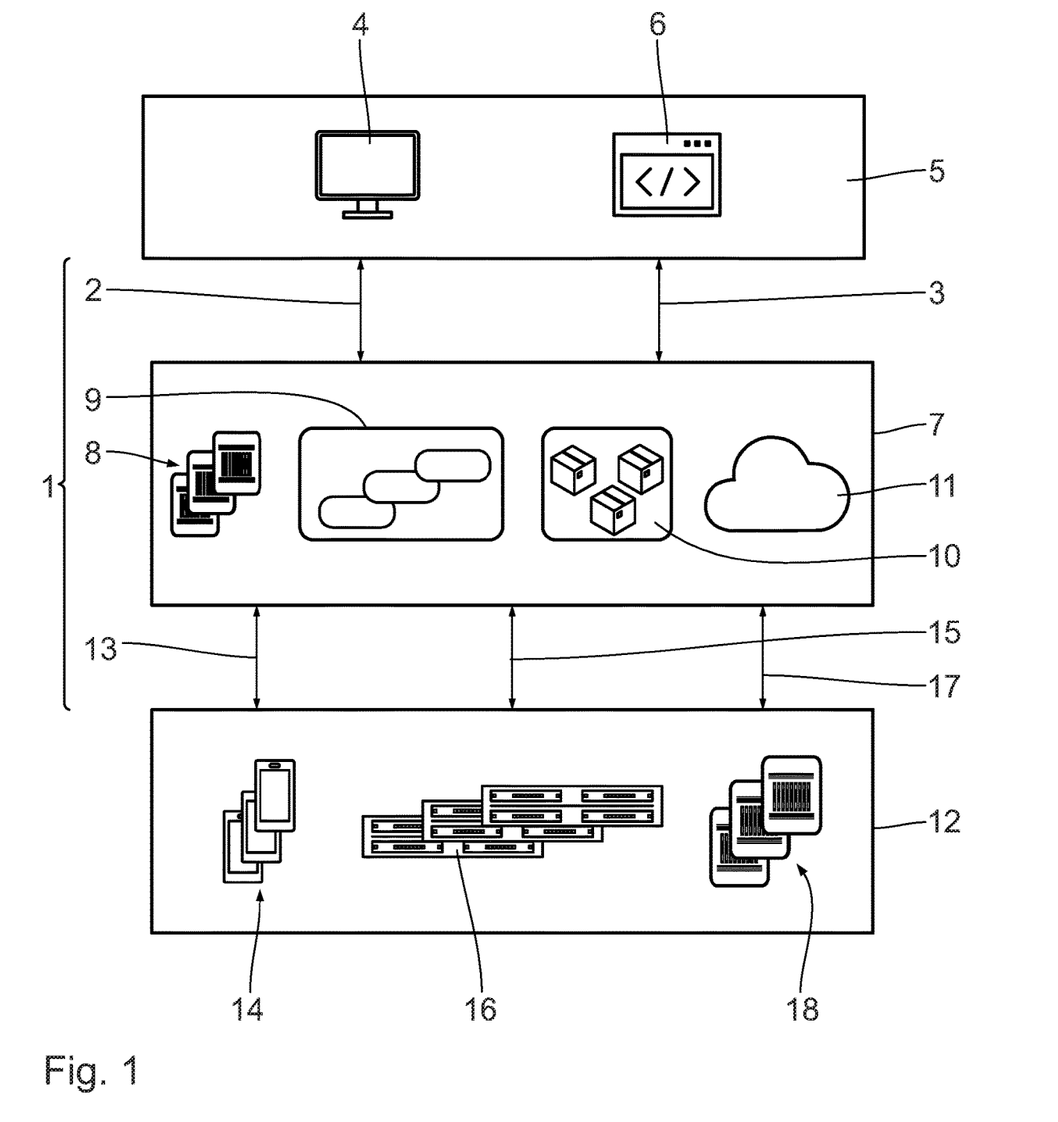
FIG. 1 schematically main components of a test system for testing a broadband cellular network, wherein with respect to central components including a central test module capable to run a predetermined test method are shown with different deployment options.

FIG. 1 shows in a block diagram a test system 1 for testing a broadband cellular network. The broadband cellular network under test may be a 5G network. The test system 1 includes user interfaces 2 and 3. The user interface 2 serves to enable a web-based user communication with a user terminal 4 which is shown in a user layer 5 to interact with the test system 1. The user interface 2 therefore is a web-based user interface.

The further user interface 3 enables a communication with an application programming module 6 which also is part of the user layer 5. The user interface 3 therefore is an application programming interface (API). Such API serves as an interface between a user software and the test system 1.

Both user interfaces 2, 3 connect the user layer 5 with a central test module 7 of the test system 1. Deployment options of the central test module 7 are common of the shelf hardware (COTS HW) 8 or a deployment as virtual machines (VM) 9 which establish respective virtualized network functions (VNFs). Other deployment options which may establish the main test module 7 may be containers 10 or a cloud service 11. The cloud service 11 is implemented on a cloud-based server. Via these options 8 to 11, a network function virtualization may be done running respective software and processes for performing predetermined test methods.

Further, the test system 1 includes further interfaces via which the central test module 7 communicates with test probes which are shown in FIG. 1 in a test probe layer 12. Via a smartphone test probe interface module 13, the central test module 7 is connected to at least one smartphone test probe 14. The smartphone test probe interface module 13 thus establishes a data/signal connection between the at least one smartphone 14 and a network component of the broadband cellular network under test. The Smartphones' Operating System, i.e. Android or iOS may be not modified for testing purposes and is presented to the tester as it would be presented to a real mobile service subscriber. Alternatively, the smartphone 14 may be equipped with a specific testing app. Such testing app may be provided via the smartphone test probe interface module 13.

Further, the test system 1 includes a radio test probe interface module 15 which also is connected to the main test module 7. The radio test probe interface module 15 establishes a data/signal connection between at least one radio test probe 16 and a network component of the broadband cellular network under test.

Further, the test system 1 includes a core network test probe interface module 17 which also is connected to the main test module 7. The core network test probe interface module 17 establishes a data/signal connection between at least one core test probe 18 and a network component of the broadband cellular network under test.

The radio test probes 16 and the core test probes 18 also are shown in the test probe layer 12.

Depending on the configuration of the test system 1, the smartphone test probes 14 and/or the radio test probes 16 and/or the core test probes 18 may be utilized and be part of the test system simultaneously or can be added or removed during the respective predetermined test method. Further, the smartphone test probes 14 and/or the radio test probes 16 and/or the core test probes 18 may be an original part of the test system 1 or may be additional, external devices which initially are not part of the test system 1 but are used by the test system 1 during the respective predetermined test method.

The test probes 14, 16, 18 may be embodied as 5G test probes.

The test system 1 configures and controls the test probes, i.e. the smartphones test probes 14, the radio test probes 16 and the core test probes 18 and the test methods. The test system 1 is scalable and connect any number of test probes 14, 16, 18 in a respective desired mix and combination. The test probes 14, 16, 18 are connected to the test system 1 via the interface modules 13, 15, 17 with an IP connection over fixed or mobile transport technologies. In addition, the test system 1 aggregates and disseminates the results from the test probes 14, 16, 18 and test methods and provides a complete view of the broadband cellular network under test for monitoring, alarming and troubleshooting.

The test system 1 can be configured and control using the web-based user interface 2 or the API module 3, 6. The API may be a programmable RESTful API. The RESTful API allows third party applications to interact with the test system 1. Depending on the configuration of the test system 1, there may be no difference in end-user functionality when using the web-based user interface 2 or the API module 3, 6.

The test system 1 can be deployed on the common of the shelf (COTS) HW 8, can be deployed as the virtual machines (VMs) 9, can be deployed as the containers 10 or can be offered as the cloud service 11. Regardless of the deployment method, the test system offers the same functionality to the end user.

Figure 2:
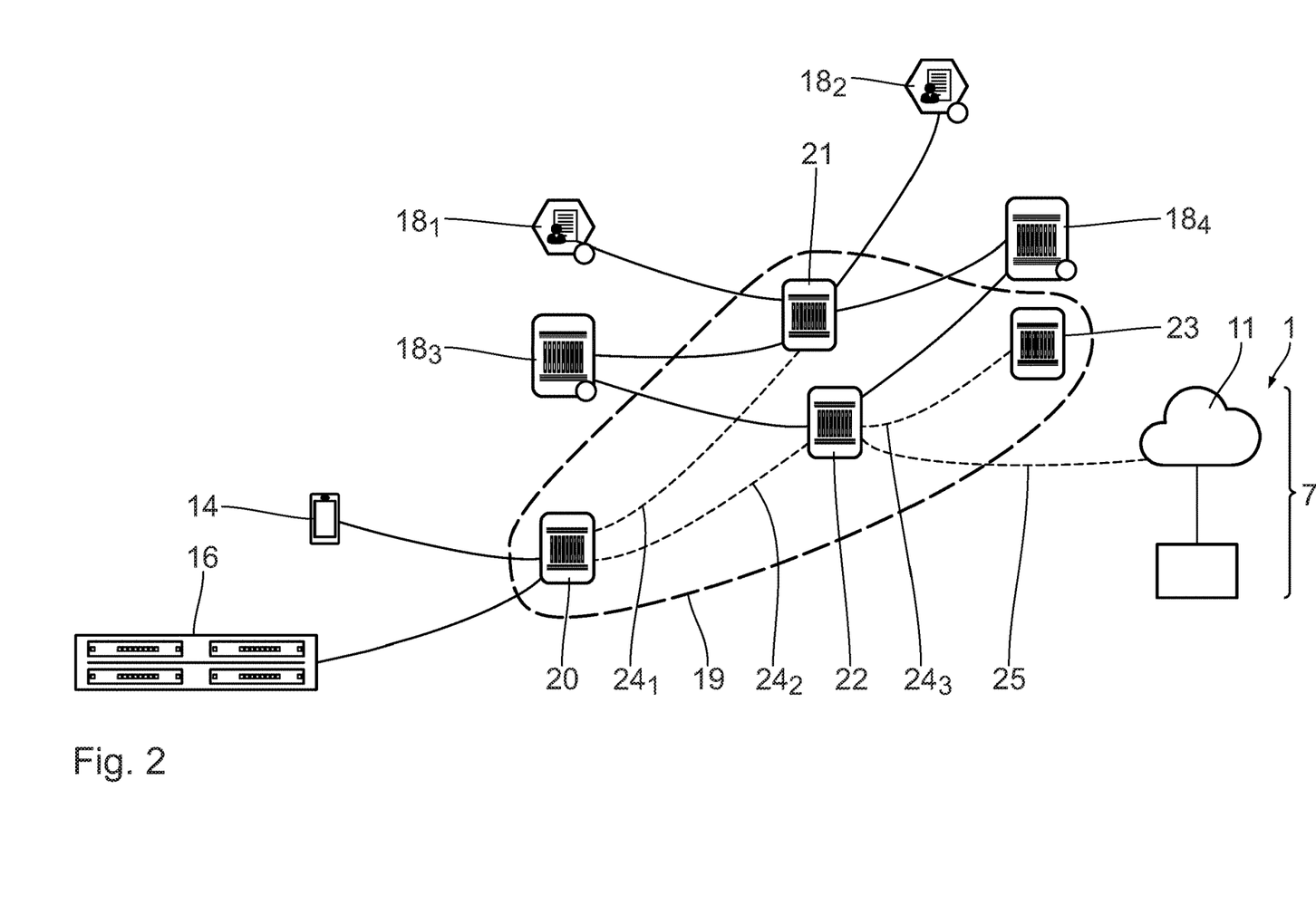
FIG. 2 an exemplified configuration of the test system including different test probes which are connected to respective network components of the broadband cellular network to be tested.

FIG. 2 shows an exemplified test probe configuration of the test system 1 used to test certain network components of a broadband cellular network 19 which may be 5G network. The main test module 7 in this case is offered as the cloud service 11. In the FIG. 2 configuration, a smartphone test probe 14 is connected to a network component 20 performing the network function gNB. To this end, the smartphone test probe interface module 13 of the test system 1 provides an interface NR Uu between the smartphone test probe 14 and the gNB network component 20.

In the FIG. 2 configuration, a radio test probe 16 also is connected to the gNB network component 20. In that respect, the radio test probe interface module 15 provides also an NR Uu interface.

Further, in the FIG. 2 configuration, four core test probes $18_1$, $18_2$, $18_3$ and $18_4$ are used within the test system 1.

The core test probe $18_1$ is provided to test an authentication server function AUSF. In that respect, the core network test probe interface module 17 of the test system 1 provides an interface Nausf between the core test probe $18_1$ and a network component 21 providing the access and mobility management function AMF.

The further core test probe $18_2$ is configured to test the unified data management UDM of the network 19. In that respect, the core network test probe interface module 17 of the test system 1 provides an interface Nudm between the core test probe $18_2$ and the AMF network component 21.

The further core test probe $18_3$ serves to test the gNodeB (gNB) function of the network 19. In that respect, the core network test probe interface module 17 of the test system 1 provides a N1/N2 interface connection of the core test probe $18_3$ to the AMF network component 21 and a N3 interface connection of the core test probe $18_3$ to a user plane function (UPF) network component 22 of the network 19.

The further core test probe $18_4$ is configured to test a session management function SMF of the network 19. In that respect, the core network test probe interface module 17 of the test system 1 provides a Namf interface connection of the core test probe $18_4$ to the AMF network component 21 and a N4 interface connection of the core test probe $18_4$ to the UPF network component 22.

The network 19 to be tested further includes a SMF network component 23. The network components 20 and 21, 20 and 22 as well as 22 and 23 are interconnected via data/signal network standard interface connections $24_1$, $24_2$ and $24_3$. Via a further standardized interface connection 25, the UPF network component 22 of the network 19 under test is connected to the cloud service 11, i.e. a data network and/or an IP multimedia subsystem (IMS). This cloud service 11 is part of the main test module 7 of the test system 1.

The network components 20 to 23 each are part of the network 19 under test. These network components 20 to 23 are in signal/data connection with the remaining network 19 via at least one standardized interface. Such standardization is according to a respective network standard, e.g. 5G.

During a predetermined test method run on the test system 1 for testing the broadband cellular network 19, initially a group of test probes, i.e. test probes 14, 16, $18_1$ to $18_4$, are assigned to the network components 20 to 23 of the network 19 to be tested via the respective interface modules 13, 15 and 17 of the test system 1. After such assignment, at least one test sequence within the network 19 is performed via the test system 1. Data and results from the test probes 14, 16, 18 and from the test sequences then are aggregated and/or combined in the test system 1, in particular in the central test module 7, to monitor the performance of the network 19. Via the user interfaces 2, 3 such data and results can be displayed and/or an interaction between third parties/third party applications and the test system 1 is enabled.

Figure 3:
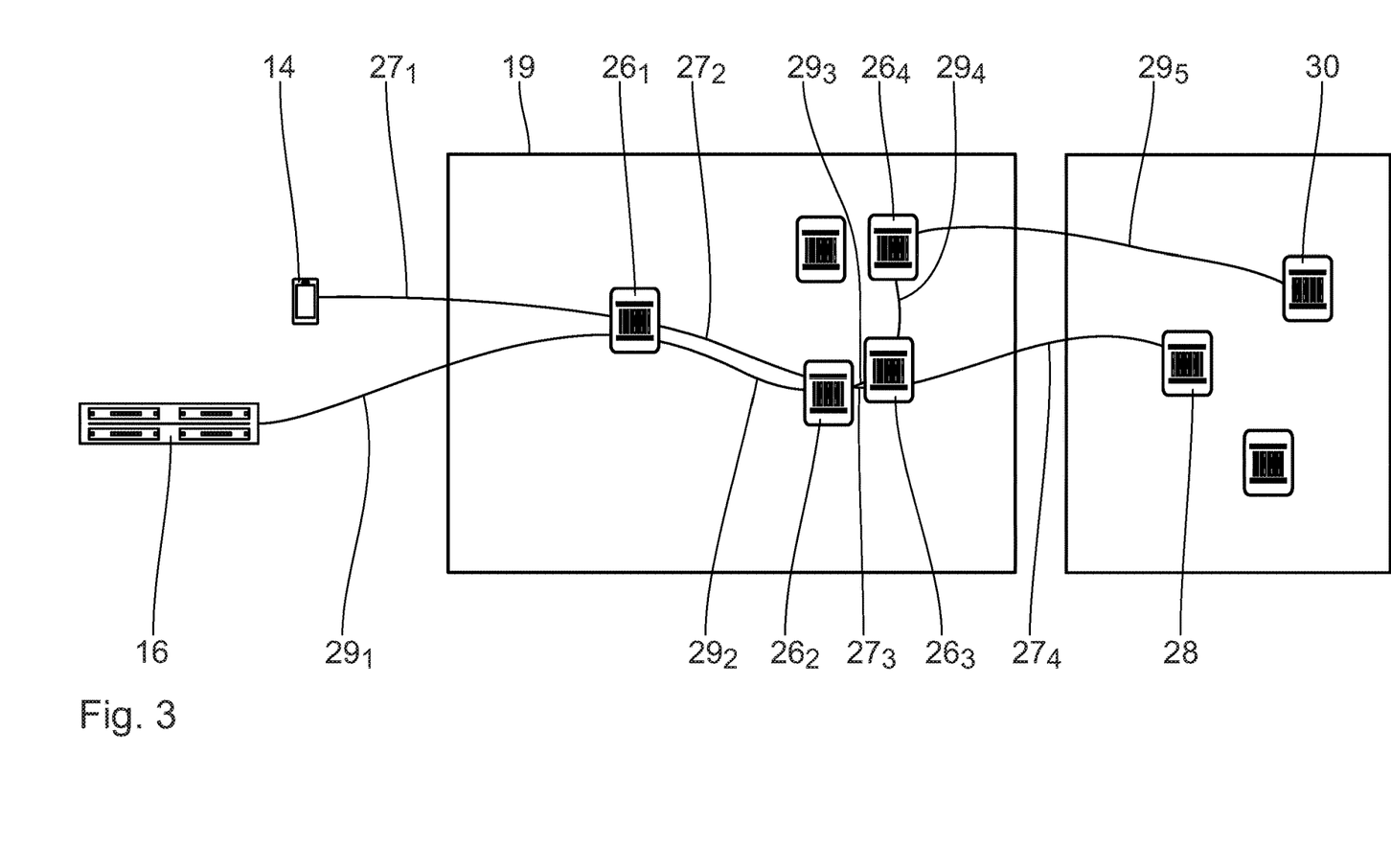
FIG. 3 schematically testing pathways of an end-to-end test method to be performed using a test system according to FIGS. 1 and 2.
Figure 4:
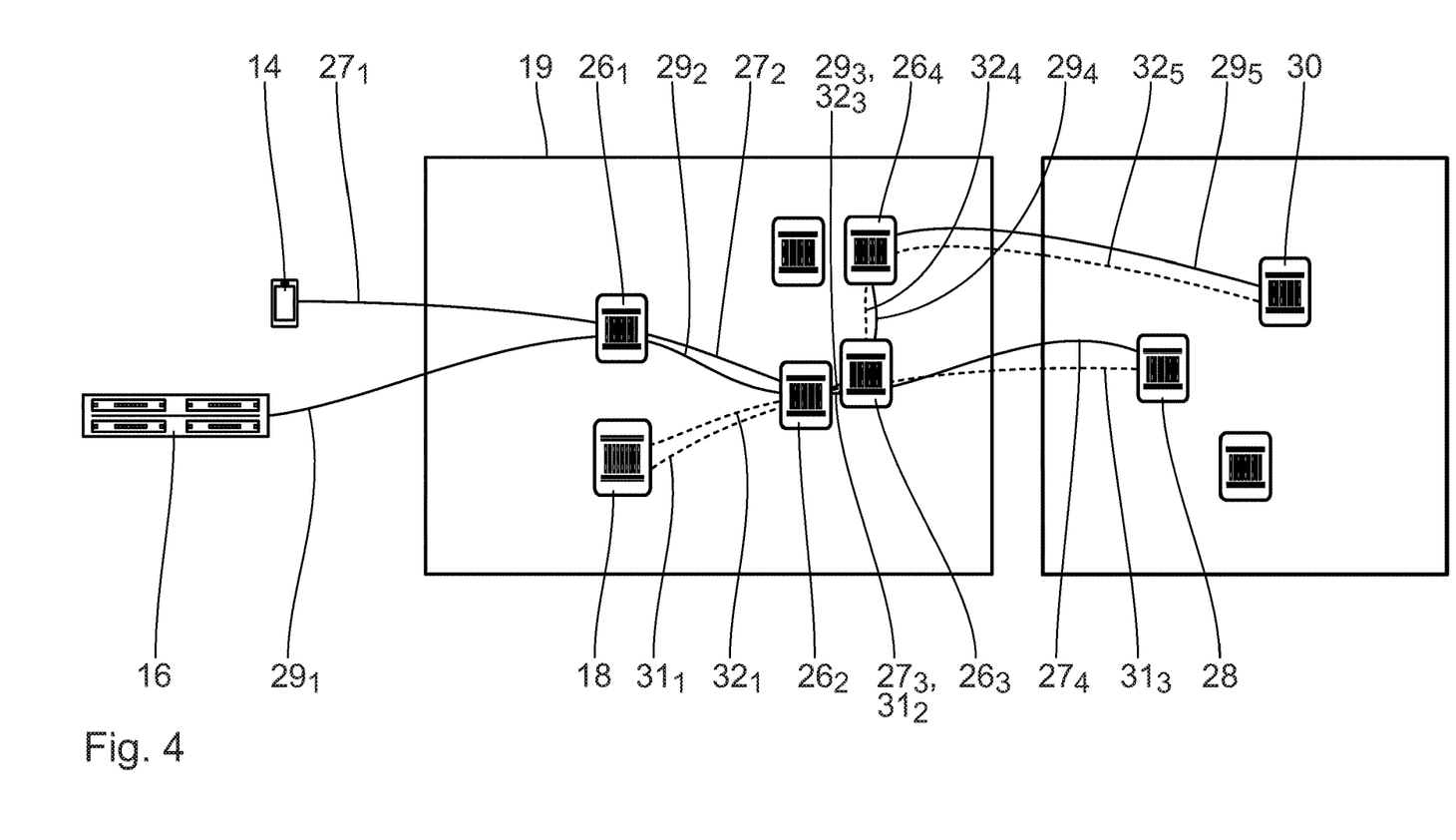
FIG. 4 in a depiction similar to FIG. 3 testing pathways of an end-to-end segmented test method to be performed with the test system according to FIGS. 1 and 2.
Figure 5:
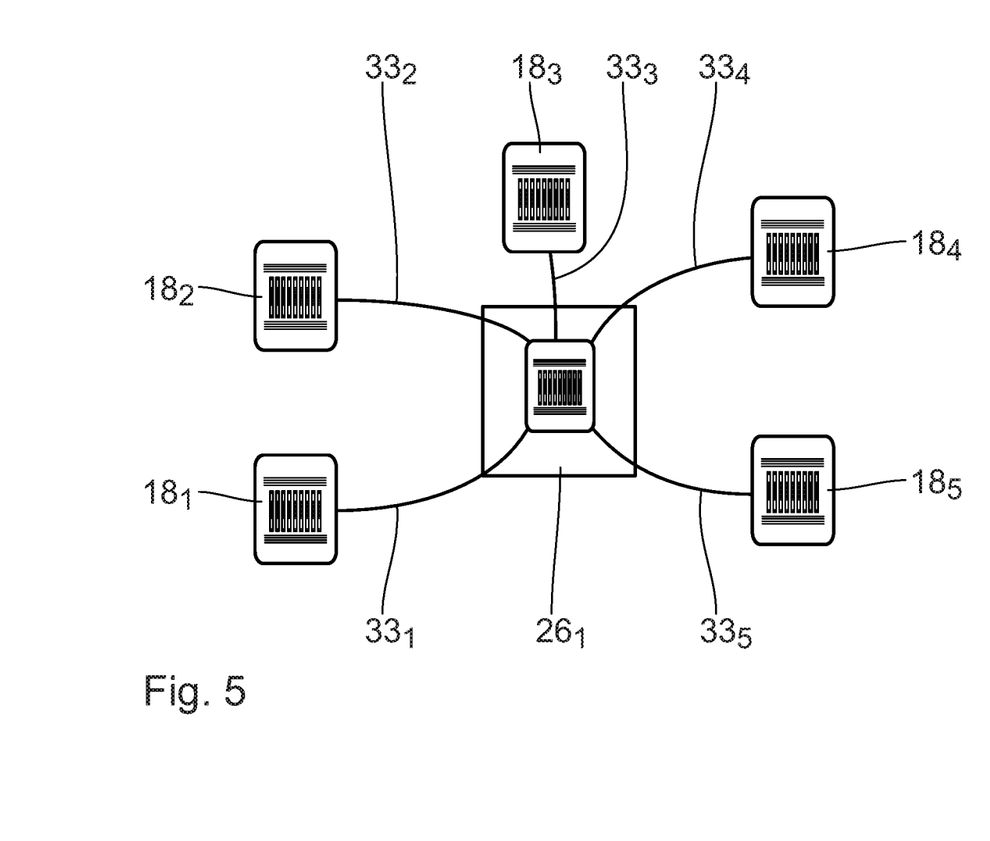
FIG. 5 schematically testing pathways of a network function isolation test method to be performed with the test system according to FIGS. 1 and 2.

With respect to FIGS. 3 to 5, more specific examples of test methods and test sequences are described.

FIG. 3 shows an example of an end-to-end (E2E) test sequence which can be performed with a specific test probe configuration of the test system 1. Here, a smartphone test probe 14 is connected to a certain network component $26_1$ via an interface connection $27_1$ which is established via the smartphone test probe interface module 13 of the test system 1. During the test sequence, further interface connections $27_2$, $27_3$ connect this network component $26_1$ and thus the smartphone test probe 14 to further network components $26_2$ and $26_3$ of the network 19 under test. Via a further interface connection $27_4$, the network component $26_3$ is connected to a specific network service 28 which can be performed via the network 19 under test.

Via the interface connections $27_1$ to $27_4$ an end-to-end testing of the network service 28 using the smartphone test probe 14 via the network component $26_1$ to $26_3$ is performed.

Further, in the FIG. 3 test probe configuration, a radio test probe 16 is connected to the network component $26_1$ via a further interface connection $29_1$ which again is provided by the radio test probe interface module 15 of the test system. Further interface connections $29_2$, $29_3$ and $29_4$ interconnect the network component $26_1$, $26_3$ and further the network component $26_3$ to a further network component $26_4$ of the network 19 under test and thus establish a data/signal connection to the radio test probe 16. Via a further interface connection $29_5$ a data/signal connection is established between the network component $26_4$ and a further network service 30 provided by the network 19 under test. Thus, via the interface connections $29_1$ to $29_5$, an end-to-end test method of the network service 30 is performed by the radio test probe 16 using the network component $26_1$ to $26_4$.

During these end-to-end test methods, the whole data/signal path between the respective test probe 14, 16 and the respective network service 28, 30 including all the intermediate network components $26_1$ to $26_3$ or $26_1$ to $26_4$ is tested.

As an example, the network service 28, 30 under test can be date service, voice service, messaging services, video services and any other application layer service offered using the network 19 under test.

When testing a 5G network 19, the E2E test method uses the 5G smartphone-based test probe 14 and/or the 5G radio test probe 16 for performing various types of tests, e.g. data, voice, video. The E2E test method uses the test system 1 and test probes 14, 16 to measure service performance (Quality of Service (QoS) and Quality of Experience (QoE)) as experienced by the end user. The test probes 14, 16 are deployed at the 5G NR Uu interface, the same interface where the subscribers will access the service.

FIG. 4 shows a configuration for an end-to-end (E2E) segmented test method. Components and functions which already have been discussed above with respect to FIGS. 1 to 3 and in particular with respect to FIG. 3 show the same reference numerals and are not explained in detail again.

In the FIG. 4 configuration, an additional core test probe 18 is implemented within the network 19 under test. Such core test probe 18 is in data/signal connection with the network components $26_2$, $26_3$ and the network service 28 via an interface connection sequence $31_1$, $31_2$ and $31_3$ which again is established via the core network test probe interface module 17 of the test system 1. Further, the core test probe 18 of the FIG. 4 configuration is in data/signal connection with the network service 30 via a further interface connection sequence $32_1$, $32_2$, $32_3$ and $32_4$. In that manner, the core test probe 18 is capable to test the network services 28, 30 bypassing the network component $26_1$. By comparing test results obtained with the test probes 14, 16 on the one hand and with the core test probe 18 on the other, it is possible to isolate and analyze the performance of the network component $26_1$.

When testing a 5G network 19, the E2E test method uses the 5G smartphone-based test probe 14 and/or the 5G radio test probe 16 for performing various types of tests, e.g. data, voice, video. The E2E segmented test method uses the 5G smartphone-based test probe 14 and/or the 5G radio test probe 16 and the 5G core test probes 18 to segment different parts of an E2E network with the scope of isolating performance or service issues. The 5G core test probe 18 can be configured to emulate different 5G network functions and their associated interface protocols, e.g. N1/N2, N3, N4 etc. The E2E segmented test method gives insight into service performance for a segment of the network 19 and identifies the network segment and/or network component where performance degradation or faults occurred.

FIG. 5 shows a configuration for testing an isolated network function $26_1$ via a multitude of core test probes $18_1$, $18_2$, $18_3$, $18_4$, $18_5$. Each of these core test probes $18_1$ to $18_5$ is in data/signal connection with the network component $26_1$ under test via specific interface connections $33_1$, $33_2$, $33_3$, $33_4$, $33_5$. These interface connections $33_1$ to $33_5$ again are provided via the core network test probe interface module 17 of the test system 1.

Via the FIG. 5 configuration, a network function isolation test method can be performed.

When testing the 5G network 19, the E2E test method uses the 5G smartphone-based test probe 14 and/or the 5G radio test probe 16 for performing various types of tests, e.g. data, voice, video. The network function Isolation method uses the 5G core test probes $18_i$ and optionally the 5G radio test probes 16 to isolate a 5G network component $26_1$, e.g. AMF with all relevant interfaces, i.e. N1/N2, N3, N4, Nausf, Nudm, Namf, for the purpose of functional, load and protocol testing of the network component $26_1$ under test. The method leverages the capability of 5G core test probes 18 to emulate various 5G network functions and their associated standardized protocol interfaces. For the network function isolation test method, one or several core test probes $18_i$ are configured to emulate the network functions and standardized interface protocols that connect directly to the network function or network component $26_1$ under test.

Further, using the test system 1, a roaming test method can be provided. In case a 5G broadband cellular network 19 is to be tested, the 5G roaming test method uses a global network of 5G radio test probes 16 and the test system 1 deployed via the cloud 11 to perform tests using in particular the E2E test method described above to test and measure 5G performance in roaming. The 5G radio test probes for 5G roaming tests may be accessed via the central test module.

In a specific test method, during an assignment of a test method to be performed by the test system 1, test probes 14, 16, 18 of the test system 1 can be assigned to different network slices $34_i$ of the network 19 to be tested. This hereinafter is described with respect to FIG. 6.

Components and functions which already have been discussed above with respect to FIGS. 1 to 5 show the same reference numerals and are not explained in detail again.

5G network slicing is a method that leverages capabilities in the 5G network architecture and functionality to create different logical networks using the same underlying physical infrastructure. This is enabled by certain configuration and identification elements that are available in the 5G protocol messages that are exchanged between a device (user equipment, UE) and the different network elements. Slices 34' under test may be realized via radio access network RAN slicing and/or via core network CN slicing.

Figure 6:
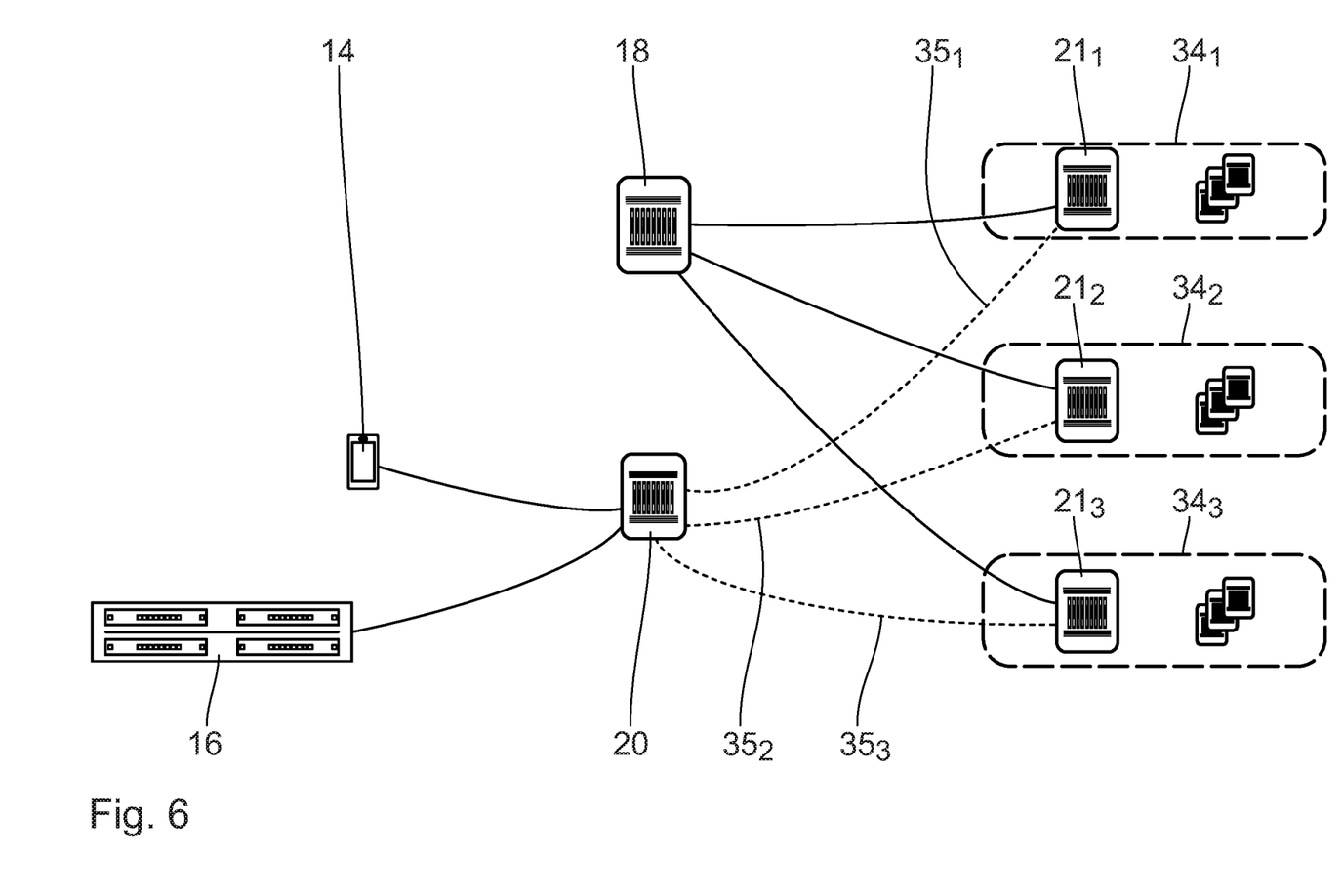
FIG. 6 in a depiction similar to that of FIG. 2 a test probe configuration wherein such test probes are assigned to different network slices of the network to be tested.

In the FIG. 6 configuration, the gNB network component 20 is in data/signal connection with network slices $34_1$, $34_2$, $34_3$ via standard interface connections $35_1$, $35_2$ and $35_3$. Connected to the gNB network component 20 in each case is a respectively sliced AMF network component $21_1$, $21_2$, $21_3$. The respective network slice $34_1$ to $34_3$ further may include an assigned session management function SMF and an assigned user plane function UPF.

The gNB network component 20 may be provided as a global network function or as a sliced function assigned to the respective network slices $34_1$ to $34_3$.

A core test probe 18 which principal functionality corresponds to that of core test probe $18_3$ in the FIG. 2 configuration is in the FIG. 6 configuration in data/signal connection with the AMF network components $21_1$ to $21_3$ of the network slices $34_1$ to $34_3$ via the respective N1/N2 interface connections which again are provided by the core network test probe interface module 17 of the test system 1.

The test method for 5G network slicing uses the 5G test probes 14, 16, 18 and test methods described in the previous sections, to provide three different levels of control, parametrization, and information depth, to test and monitor the 5G network slices $34_1$ to $34_3$. The test method can test both RAN and core network slicing and does not depend on the mode in which the network slice $34_1$ to $34_3$ is designed and implemented.

The 5G smartphone-based test probe and test method provides the highest level of information and control for testing 5G network slicing. The smartphone test probe 14 can be configured to reproduce and automate the same behaviour that a user in the slice $34_i$ will have at the user interface level of a smartphone. The information provided by these smartphone test probes 14 reflects the 5G QoE as experience by the end user, considering the specific 5G smartphone test probe 14 and the specific 5G network slice $34_i$. For this test method, the network slice $34_i$ is selected based on the subscription information of a SIM card that is used for the test.

The 5G radio test probe and test method provides an intermediate level of information and control for testing 5G network slicing. The information provided by these radio test probes 16 reflect the QoS provided by the 5G network slice $34_i$, independent of a particular 5G smartphone implementation. In addition, the test method extracts the NSSAI (network slice selection assistance information) list and S-NSSAI(s) (single-network slice selection assistance information) are from the Radio Resource Control and Non-Access Stratum traces and provides them as KPIs (key performance indicators). A NSSAI list and/or a correlation of QoS to the respective slice $34_i$ are examples for test parameters which are acquired for the different network slices $34_i$ during the test method and in particular during the performance of at least one test sequence and during the aggregation of the data and results from the test probes and the test sequences.

For this test method, the network slice $34_i$ is selected based on the subscription information of the SIM card that is used for the test.

The 5G core network probes and test method provides the lowest level of information and control for testing 5G network slicing. The 5G core network test probes 18 provides the ability to control parameters at the protocol level, thus allowing the test system to configure the NSSAI list and SNSSAI(s) and emulate end user for the respective network slices $34_i$. Depending on the type of 5G core network probe 18, i.e. 5G emulate interface, the NSSAI and S-NSSAI(s) will be configured according to the particular protocol running on that interface, e.g. Layer 3 Non Access Stratum NAS, NGAP. A Layer 3 trace is a trace at protocol layer 3, which is responsible for Radio Resource Control and Non-Access Stratum Messages.

The test system 1 aggregates the data and results from the 5G test probes and test methods described above and can be used to monitor the performance for each 5G network slice 34, based on the NSSAI and S-NSSAI(s). Furthermore, the capabilities of the test system 1 allow processing of test data related to network slices $34_i$ to:

Create overall slice performance KPIs using a weighted aggregation method for test data retrieved from 5G smartphone, radio and core test probes 14, 16, 18.

Correlate and derive insights from per slice test data from the different probes, e.g. correlate degraded performance or service unavailability on a 5G smartphone with KPIs derived from core test probes 18, which are running tests on the same slices $34_i$ (same S-NSSAI).

The test system 1 and the test methods explained above can be integrated into a continuous integration/continuous development software engineering process, in particular in a CI/CD pipeline. This hereinafter also is described with respect to FIG. 7. Components and functions which already have been discussed above with respect to FIGS. 1 to 6 show the same reference numerals and are not explained in detail again.

Figure 7:
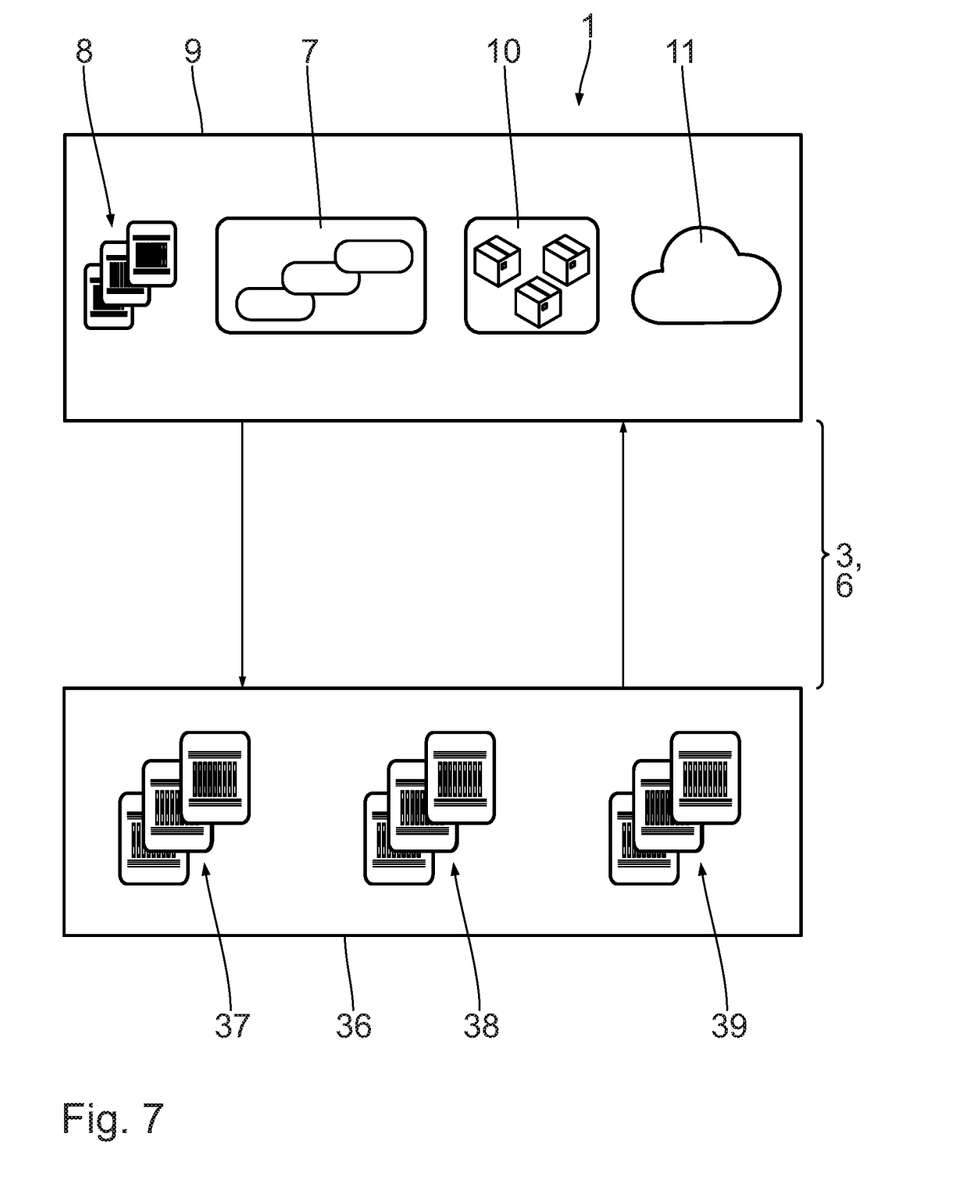
FIG. 7 in a depiction similar to that of FIG. 1 the deployment options of the main test module of the test system together with network functions, third party systems and development/operation tools which may be controlled and/or configured to execute tailored automated test sequences via the test system.

Via the user interface 3 and the application program interface module 6, the main test module 7 is in data/signal connection with a user layer 36 including specific network components/network functions 37 to be implemented in a broadband cellular network, in particular in a 5G network, third party systems 38 and development/IT operations (DevOps) tools 39. Via the application programming interface module 6, the test methods and procedures can be controlled and/or configured to execute tailored automated test sequences. In particular, an interaction between third party applications in the user layer 36 and the test system 1 is enabled. A control and a configuration of data extraction and measurements of the test system also can be enabled. Further, via the application programming interface module 6, components external to the network 19 to be tested, in particular the third party systems 38 in the user layer 36 are controlled and/or configured to execute tailored automated test sequences.

The CI/CD process, created initially for software development and deployment, enables automated rollout of new software releases at a fast pace. CI/CD processes are now being applied to 5G and is enabled by the design of the 5G network and its functions which allows the integration of 5G network and service design, deployment, launch and operation processes into an automated CI/CD process.

The test system 1 described in the sections provides methods and components that allow the test system to be integrated in any CI/CD process tools such as Jenkins, CircleCI, AWS CodeBuild, Azure DevOps, Atlassian Bamboo, or Travis CI, etc. When integrate in such tools, the test system 1, test probes 14, 16, 18 and test methods can be applied for continuous testing. The test system provides:

The application programmable interface (API) 6 that enables the third party systems which include, but are not limited to CI/CD tools, functions, or software to control the test system 1—the ability to be automated Methods that are used by the test system 1 to control third party systems, functions, or software—the ability to automate.

The test system 1 provides the application programmable interface (API) 6 that may follow an industry standard architecture. The API 6 allows third party systems, which include, but are not limited to CI/CD tools, and software to control and automate the test system 1. The API 6 allows third party systems, tools, and software to:

Control and configure the test methods available in the test system 1;

Extract data and measurements from the test system 1;

Subscribe to events generate by the test system 1, e.g., alarms.

Examples of such tools can be Dev/Ops tools, e.g. Jenkins, CircleCI, AWS CodeBuild, Azure DevOps, Atlassian Bamboo, or Travis CI, messaging and collaboration systems, e.g. Slack, and any other tool that can interact in particular with the RESTful API of the test system 1.

The test system 1 provides tools and methods that can automate and interact third party systems 38, functions, or software. The test system 1 provides:

Methods to automate interactions and control with the APIs exposed by the third party systems 38, tools, and software;

Methods to automate the interaction with command line interfaces exposed by the third party systems 38, tools, and software;

Methods to automate the interaction with web-based applications, in particular with the 5G network function 37 and the DevOps tools 39.

Access to at least some of the used test probes 14, 16, 18 can be established via the cloud based server, i.e. via the cloud service 11.

What is claimed is:

1. A test method for testing a broadband cellular network using a test system for testing a broadband cellular network, the test system including:
   at least one user interface,
   at least one central test module capable to run a predetermined test method,
   a smartphone test probe interface module being connected to the central test module, the smartphone test probe interface module being capable to establish a data/signal connection between at least one smartphone test probe and a network component of the broadband cellular network,
   a radio test probe interface module being connected to the central test module, the radio test probe interface module being capable to establish a data/signal connection between at least one radio test probe and a network component of the broadband cellular network,
   a core network test probe interface module being connected to the central test module, the core network test probe interface module being capable to establish a data/signal connection between at least one core test probe and a network component of the broadband cellular network,
   the test method including the following steps:
   assigning a group of test probes to network components of the network to be tested via the respective interface modules,
   performing at least one test sequence within the network,
   aggregating the data and results from the test probes and the test sequences to monitor the performance of the network.

2. The test method according to claim 1,
   wherein the central test module is implemented on a cloud based server, and
   wherein access to at least some of the used test probes is established via the cloud based server.

3. The test method according to claim 1, wherein with help of at least some of the test probes, an end-to-end test sequence is performed.

4. The test method according to claim 1, wherein with help of at least some of the test probes, a test sequence to test a group of network components is performed.

5. The test method according to claim 1, wherein with help of at least some of the test probes, a test sequence to test a single network component is performed.

6. The test method according to claim 1, wherein during the assignment test probes are assigned to different network slices of the network to be tested.

7. The test method according to claim 6, wherein during the test performance and the data aggregation test parameters are acquired for different network slices.

8. The test method according to claim 1, wherein via the application programming interface the test procedures are at least one of controlled and configured to execute tailored automated test sequences.

9. The test method according to claim 1, wherein via the application programming interface components external to the network to be tested are at least one of controlled and configured to execute tailored automated test sequences.

10. The test method according to claim 1, wherein with the help of at least some of the test probes a test sequence to test a roaming network is performed.

* * * * *